(12) United States Patent
Cornell et al.

(10) Patent No.: US 6,330,320 B1
(45) Date of Patent: Dec. 11, 2001

(54) ENHANCED CONFERENCE CALL SERVICE

(75) Inventors: Peter S. Cornell, Conyers, GA (US); Robert Bergman Levy, Branchburg, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/215,016

(22) Filed: Dec. 17, 1998

(51) Int. Cl.[7] ................................................ H04M 3/42
(52) U.S. Cl. ............................................... 379/202.01
(58) Field of Search ................................... 379/202–206

(56) References Cited

U.S. PATENT DOCUMENTS

| | | | |
|---|---|---|---|
| 5,369,694 | * 11/1994 | Bales et al. | 379/206 |
| 5,408,526 | 4/1995 | McFarland et al. | 379/202 |
| 5,631,904 | * 5/1997 | Fitser et al. | 370/261 |
| 5,638,434 | * 6/1997 | Gottlieb et al. | 379/203 |
| 5,953,400 | * 9/1999 | Rosenthal et al. | 379/202 |
| 6,088,435 | * 7/2000 | Barber et al. | 379/205 |

* cited by examiner

*Primary Examiner*—Harry S. Hong
*Assistant Examiner*—Hector Agdeppa
(74) *Attorney, Agent, or Firm*—Robert B. Levy

(57) ABSTRACT

A subscriber (12) seeking to enter a conference call does so by dialing a non-directory conference call access telephone number maintained by a telephone carrier for conference call service. Upon receipt of the call within its network (14), the carrier identifies the subscriber, and thereafter determines from a record stored in a database (24) the identity of the conference call that the subscriber desires to enter. Knowing the identity of the conference call, the network (14) can then route the subscriber's call to the corresponding bridge (26) carrying the conference call. In this way, the subscriber seeking to enter a conference call need not know the particular conference bridge number or access code.

11 Claims, 2 Drawing Sheets

ENHANCED CONFERENCE CALL SERVICE

TECHNICAL FIELD

This invention relates to a technique for providing telephone subscribers with an enhanced ability to engage in conference calls.

BACKGROUND ART

Many telecommunications carriers, such as AT&T, offer conference call service whereby three or more callers may participate in the same call. To establish a conference call, a host typically arranges with a telecommunications carrier to reserve a number of connections (i.e., ports) on a telecommunications bridge, which is a device within the carrier's network that combines (bridges) a plurality of telephone calls. The host may manually interact with an operator of the telecommunications carrier who, in turn, undertakes the necessary steps to reserve the required number of ports on a particular bridge. Alternatively, a host may reserve the requisite number of bridge ports by interacting with an automated system such as that described in U.S. Pat. No. 5,408,526, issued in the name of James McFarland et al. and assigned to AT&T (herein incorporated by reference). Once the host has reserved the requisite number of ports on the bridge, each participants (including the host) enters the conference call by directly dialing a telephone number associated with the bridge for connection to a bridge port. Upon receipt of a call, the bridge authenticates the caller by prompting for an identifier in the form of an access code. Only when the caller enters the proper access code for the particular conference call does the bridge connect the caller with others who have already joined the conference call.

To enter the conference call, each participant must know both the telephone number of the bridge as well as the requisite access code. (In practice, the host receives a separate access code from the other participants to afford the host the ability to control various aspects of the call.) Before a scheduled conference call, the host must communicate the bridge number and access code to each participant. For a large number of participants, ensuring that each scheduled participant receives the bridge number and participant code can prove cumbersome, particularly for participants at different locations. The problem of notifying all the conference participants of the conference bridge number and access code becomes even more pronounced for conference calls that occur on a frequent basis, such as every week or even every day. To alleviate this difficulty, some carriers allow the host to reserve the same bridge and use the same participant code. However, not all carriers afford every conference call host the ability to reserve the same bridge for every conference call.

To obviate the need to communicate the bridge number to every participant, some telecommunications carriers that provide conference call service will automatically launch a call to each participant at the start of the conference call. This approach works well for participants whose locations, and telephone numbers are known in advance of the conference call. Unfortunately, telecommunications carriers that provide this type of conference call service may not know the location of every intended participant at the outset of the conference call. For example, one or more invited participants may be away traveling, yet available to participate from a pay telephone. While launching a call to each participant obviates the need for the participant to know the bridge number, the participant must still receive the requisite access number for authentication in order to join the conference call.

Thus, there is a need for an enhanced conference call service that allows telephone subscribers to participate in a conference call from any location without advance knowledge of a particular bridge number and access number.

BRIEF SUMMARY OF THE INVENTION

Briefly, the present invention provides a method for establishing at least one pre-identified conference call in a telecommunications network that includes at least one bridge designated to carry said call, without the need for each participant desirous of joining the call to know the specific telephone number associated with the bridge. The method of the invention commences upon receipt in the network of a telephone call dialed to a non-directory number independent of the bridge by a caller who desires to participate in the conference call. The non-directory number typically comprises a toll-free (e.g., 800, 888, or 877) telephone number or a local number that has no direct destination, but rather must be translated for routing purposes. Upon receipt of the call, the network identifies the caller. For example, the network may identify the caller from the number dialed by the caller or from a PIN entered by the caller in response to a network prompt. Alternatively, or in addition to such identifiers, the network may employ the caller's voice and/or the caller's originating number for authentication purposes. In accordance with the caller's identity, the network identifies the conference call in which the caller desires to participate. Thereafter, the network determines the bridge designated to carry the one conference call that the caller desires to enter and then routes the call to that bridge.

The above-described method obviates the need for the caller to know the particular bridge number and access code. Instead, the caller need only know a single non-directory telephone number, typically a general access number maintained by the telecommunications carrier for conference call service. From the call placed by the caller to the conference call access number as well as information maintained in its network, the telecommunications conference call service provider automatically determines the identity of the caller. Having identified the caller, the network can then establish the identity of teleconference call, and can automatically route the call to the bridge assigned to carry the conference call. Rather than requiring the participant to know the individual number for each bridge, the participant need only know the conference call access number which typically remains invariant. Moreover, the participant need not know the access code since the network will authenticate the caller based on information within the network itself.

DETAILED DESCRIPTION

Figure 1:
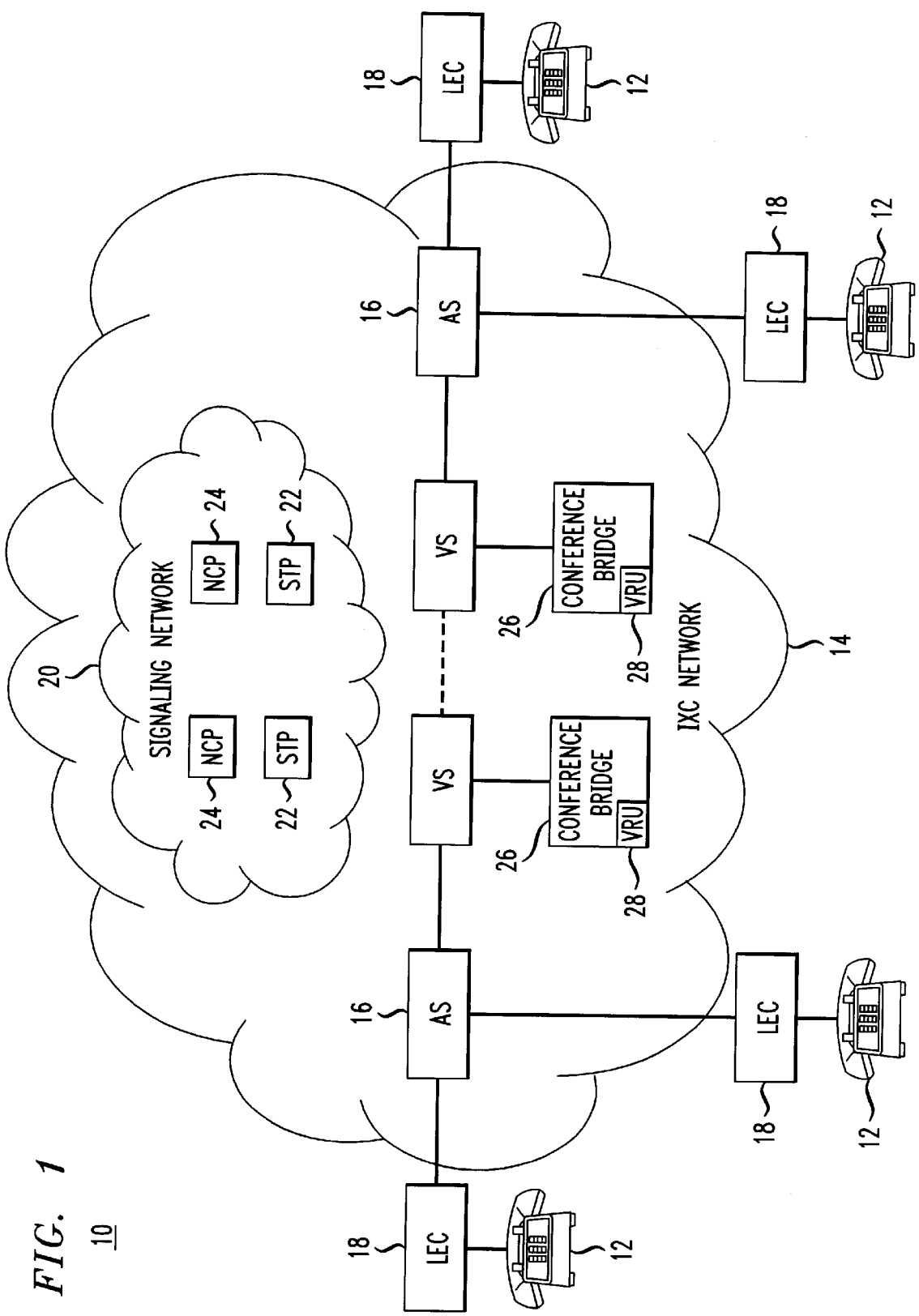
FIG. 1 depicts a block schematic diagram of a telecommunications network for providing conference call service in accordance with the invention.

FIG. 1 illustrates a telecommunications network 10 for offering teleconferencing service in accordance with the invention whereby one or more individual subscribers 12-12 (represented by telephone station sets) may participate in a conference call without apriori knowledge of a bridge number and access code. In the illustrated embodiment, the network 10 includes an Inter-Exchange (IXC) telecommunications network 14, such as the IXC network maintained by AT&T. The individual subscribers 12-12 each access the IXC network 14 to participate in a conference call through the subscriber's Local Exchange Carrier (LEC) 18. In the embodiment illustrated in FIG. 1, each subscriber 12 receives service from a separate LEC 18, although a given LEC could easily serve multiple individual subscribers.

The IXC network 14 includes a plurality of access switching systems 16-16 (only two of which are shown), each typically comprised of a No. 4ESS switching system formerly manufactured by Western Electric (now Lucent Technologies, Inc.). Each access switching system (AS) 16 is associated or "homed" to one or more LECs 18-18 for receiving calls originated by, and for sending calls to, a subscriber 12 served by that LEC. The access switching systems 16-16 are interconnected, either directly, or as seen in FIG. 1, through one or more via switching systems 18-18, each via switching system (VS) also typically comprising a 4ESS switching system.

The IXC network 14 also includes signaling network 20, such as AT&T's SS7 signaling network that includes one or more Signal Transfer Points (STPs) 22-22 for collecting and routing signaling information, such as call set-up information, between and among the access switching systems 16-16 and the via switching systems 18-18. In addition to the STPs 22-22, the signaling network 20 also includes one or more network control points (NCPs) 24-24 that take the form of databases that store information, including instructions and/or data for access by one or more of the switching systems 16-16 and 18-18 to facilitate call processing.

To afford the subscribers 12-12 the ability to establish a conference call among themselves, the IXC network 14 includes one or more conference bridges 26-26, each typically associated with one of the switching systems 16-16 and 22-22, although the illustrated embodiment in FIG. 1 only shows the via switching systems 22-22 as having associated conference bridges. Each conference bridge 26 includes a plurality of ports (not shown), that receive individual telephone calls from subscribers 12-12 that are bridged together to enable multiple subscribers to participate in the same call.

Heretofore, a subscriber 12 seeking to participate in a conference call would dial a telephone number (i.e., a "bridge number") corresponding to an associated one of the bridges 26-26 reserved for such a conference call. Upon receipt of the bridge number, the subscriber's LEC 18 would forward the call to its associated access switching system 16. In turn, the access switching system 16 routes the call to the corresponding bridge 26 reserved for the conference call. Thereafter, the bridge 26 receiving the call authenticates the subscriber 12 seeking to participate in the call by prompting the subscriber for an access code. To that end, each bridge 26 typically includes a voice response unit (VRU) 28 for prompting the subscriber and for analyzing the DTMF signals entered by the subscriber in response to the prompt.

The disadvantage associated with the above-described conference call service is that each subscriber 12 seeking to participate in the conference call must know the bridge number and access code in advance of the scheduled conference call. As discussed earlier, a conference call host must communicate that information in advance; a time consuming task especially if there are many invited participants.

Figure 2:
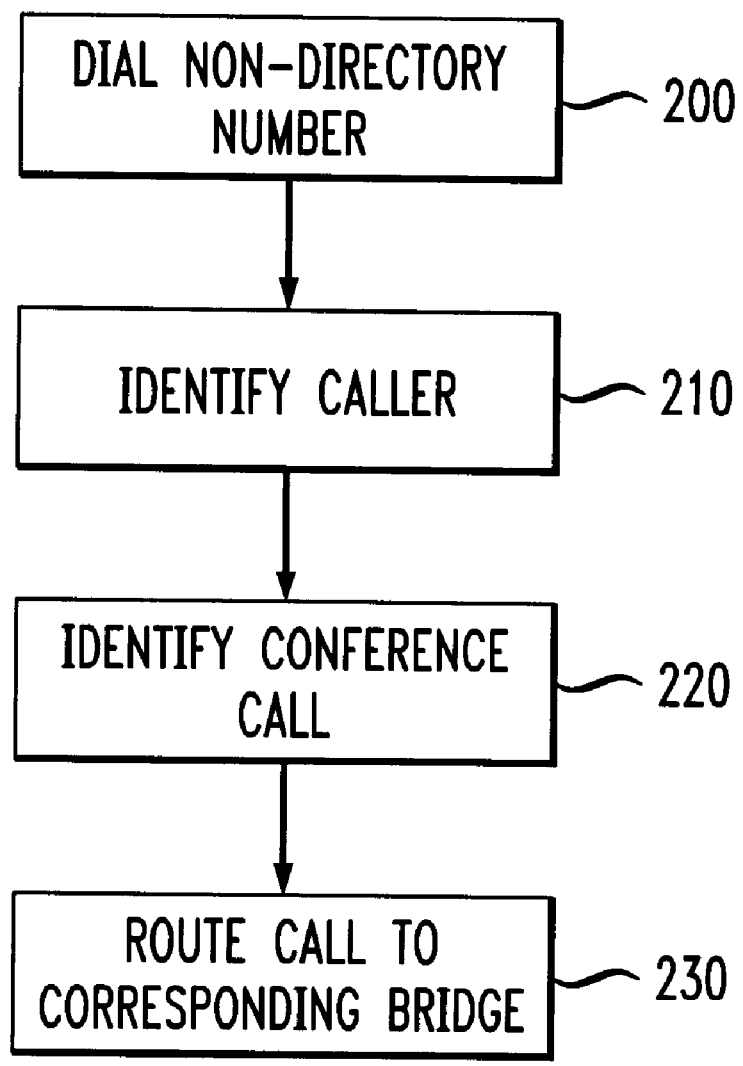
FIG. 2 depicts a flow chart diagram of the steps of establishing a conference call in accordance with the invention.

The present invention overcomes this disadvantage by affording a conference call service that allows a subscriber to dial in from any telephone set without apriori knowledge of the particular bridge number or/or access code. Referring to FIG. 2, which illustrates the steps associated with the conference call method of the invention, a subscriber 12 of FIG. 1 seeking to participate in a conference call dials a non-directory telephone number (step 200). For purposes of definition, a non-directory number is a telephone number that is not associated with a specific destination, such as a telephone bridge. In practice, the non-directory number comprises a toll free (e.g., 800, 888, or 877) number, or even a local number, that is designated for to receive calls from subscribers desiring to participate conference calls generally carried by the network 14, rather than a single specific conference call.

The call dialed by the subscriber 12 seeking to participate in conference call is received in the network 14 of FIG. 1 from the subscriber's LEC 18. Upon receipt of the call, the network 14 identifies the subscriber using information derived from the call and or from the subscriber (step 210). For example, the network 14 can identify the subscriber based on the particular non-directory number the subscriber dialed. To that end, individual non-directory numbers are assigned to separate individuals, or group of individuals. Based on the particular non-directory number dialed by the subscriber 12, the access switching system 16 receiving the call, or a via switching system 18 to which the call is routed for processing, would access one of the NCPs 24-24 to locate a record that identifies the subscriber.

Rather than identify the subscriber based on the dialed number, the access switching system 14 (or alternatively, one of the via switching systems 18-18) could identify the subscriber based on a Personal Identification Number (PIN) entered by the subscriber. (The PIN would identify the subscriber, as opposed to a conventional access code that identifies a particular conference call.) The VRU 28 in a conference bridge 28 or another VRU (not shown) prompts the subscriber for the PIN and thereafter interprets the DTMF responses entered by the subscriber following such a prompt. Alternatively, the subscriber's speech, or the subscriber's originating number could serve as identifiers. Indeed, the subscriber can be identified from a combination of one or more of the following: the dialed number, PIN, the subscriber's speech, and the subscriber's originating number.

After the network 14 has identified the subscriber, the network then proceeds to determine the particular conference call the subscriber desired to enter (Step 220). In accordance with the conference call method of the invention, a host desirous of setting up a conference call in the network 14 will not only reserve the requisite number of ports on one of the bridges 28-28 in advance of the call, but also identify the participants to the call to the network 14. Initially, the host will need to provide the identities of the participants to the network 14 or have the participants themselves provide their identity, such as when the subscriber's speech serves as one of the identifies. After receiving the participants' identity information, the network 14 stores this information, typically in one of the NCPs 24-24. For subsequent conference calls among previously identified participants, the host only needs to reserve the requisite number of bridges and identify those participants to the scheduled conference call because the network 14 already knows the identity of the participants.

From knowledge of the identity of the subscriber, and the information received from the host regarding the identities of the subscribers to a specific conference call, the network can then identify the particular bridge 28 that carriers the identified conference call in which a subscriber wishes to participate (step 230). From knowledge of which bridge carries which call, then routes the call from the subscriber 12 to the corresponding bridge 28 carrying the conference call.

The above described method affords the advantage that a participant seeking to enter a particular conference call need not know the particular bridge number or even the access code. Rather, the subscriber need only know the conference call access number of the telecommunications carrier carrying the conference call. Upon receipt of a call from a subscriber seeking to enter the conference call, the network automatically identifies the subscriber and conference the subscriber desires to enter and thereafter routes the subscriber's to the appropriate conference bridge carrying the conference call.

The above-described embodiments merely illustrate the principles of the invention. Those skilled in the art may make various modifications and changes that will embody the principles of the invention and fall within the spirit and scope thereof.

What is claimed is:

1. A method for conducting at least one identified conference call within a telecommunications network that includes at least one bridge designated to carry said one identified conference call pre-arranged by a host, said method comprising the steps of:

receiving in the network in advance of the identified conference call a list of callers specifically identified by the host as eligible to participate in the identified conference call based on the caller's identity, receiving within the network an incoming telephone call dialed to a non-directory telephone number independent of said bridge from a caller wishing to participate in the identified conference call;

identifying the caller from the incoming call and determining whether the caller is on the list of callers the host has deemed eligible to participate in the identified conference call and if so;

determining from the identity of the caller the identified conference call; and routing the call from the caller to said one bridge designated to carry identified conference call.

2. The method according to claim 1 wherein the non-directory number comprises a toll-free telephone number.

3. The method according to claim 2 wherein the non-directory number comprises an 800 toll-free number.

4. The method according to claim 2 wherein the non-directory number comprises an 888 toll-free number.

5. The method according to claim 2 wherein the non-directory number comprises an 877 toll-free number.

6. The method according to claim 2 wherein the non-directory number comprises a local telephone number.

7. The method according to claim 1 wherein the step of identifying the caller includes the step of identifying the caller from the non-directory number dialed by the caller.

8. The method according to claim 1 wherein the step of identifying the caller includes the step of identifying the caller from a PIN entered by the caller.

9. The method according to claim 1 wherein the step of identifying the caller includes the step of identifying the caller from speech uttered by the caller.

10. The method according to claim 1 wherein the step of identifying the caller includes the step of identifying the caller from a telephone number from which the caller originated the incoming call.

11. The method according to claim 1 wherein the step of determining the identified conference call includes the step of accessing a database containing records of callers and which conference call each caller is eligible to enter.

* * * * *